United States Patent [19]

Roman

[11] Patent Number: 4,784,402

[45] Date of Patent: Nov. 15, 1988

[54] AUTOMOBILE DOLLY SYSTEM

[76] Inventor: Andrew B. Roman, P.O. Box 475, Story, Wyo. 82842

[21] Appl. No.: 866,026

[22] Filed: May 23, 1986

[51] Int. Cl.[4] .................................... B60P 3/40

[52] U.S. Cl. .................................... 280/79.1 A

[58] Field of Search ................ 280/32.6, 47.15, 47.35, 280/87.01, 79.1 R, 79.1 A; 414/426, 430

[56] References Cited

U.S. PATENT DOCUMENTS

| | | | |
|---|---|---|---|
| 863,122 | 8/1907 | Weber | 280/79.1 R |
| 864,680 | 8/1907 | Neville et al. | 280/47.35 |
| 968,316 | 8/1910 | Beckert | 280/79.1 A |
| 1,288,057 | 12/1918 | Larson | 280/47.15 |
| 1,343,650 | 6/1920 | Snyder | 280/79.1 R |
| 2,246,882 | 6/1941 | Gentry | 280/79.1 R |
| 2,470,054 | 5/1949 | Schildmeier | 280/79.1 R |
| 2,503,138 | 4/1950 | Smith | 414/426 |
| 2,943,863 | 7/1960 | Corey et al. | 280/79.1 A |
| 2,990,191 | 6/1961 | Black | 280/79.1 |
| 3,066,946 | 12/1962 | Nelson | 280/79.1 R |
| 3,215,402 | 11/1965 | Hott et al. | 414/430 |
| 3,982,768 | 9/1976 | Getman | 280/79.1 R |
| 4,060,258 | 11/1977 | Pigeon | 280/79.1 A |
| 4,471,971 | 9/1984 | Keesler | 280/79.1 A |

*Primary Examiner*—John J. Love

*Assistant Examiner*—Richard Camby

*Attorney, Agent, or Firm*—Berman, Aisenberg and Platt

[57] ABSTRACT

A dolly is disclosed which permits an automobile to be easily moved about a repair shop. In one embodiment, the length of the dolly is approximately equal the width of an automobile and is adapted to receive either the wheels of the automobile or a jackstand for supporting the automobile with one or more wheels removed. In a second embodiment, the length of the dolly is less than the width of an automobile and accessory cradles are attached to the dolly to receive the automobiles' wheels.

8 Claims, 2 Drawing Sheets

FIG 6
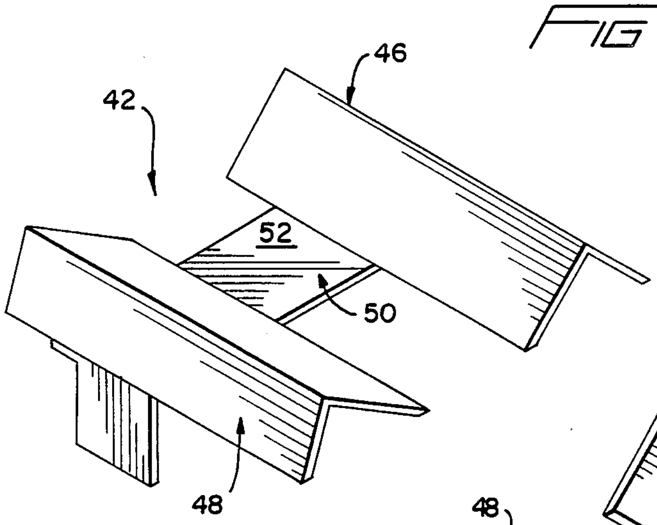
FIG 7
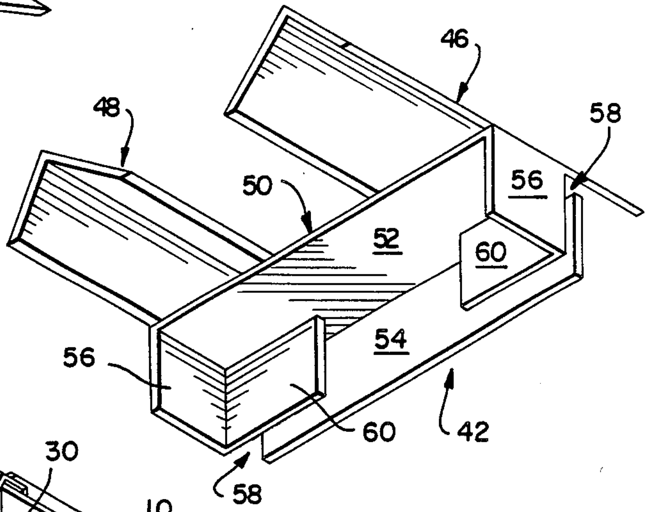
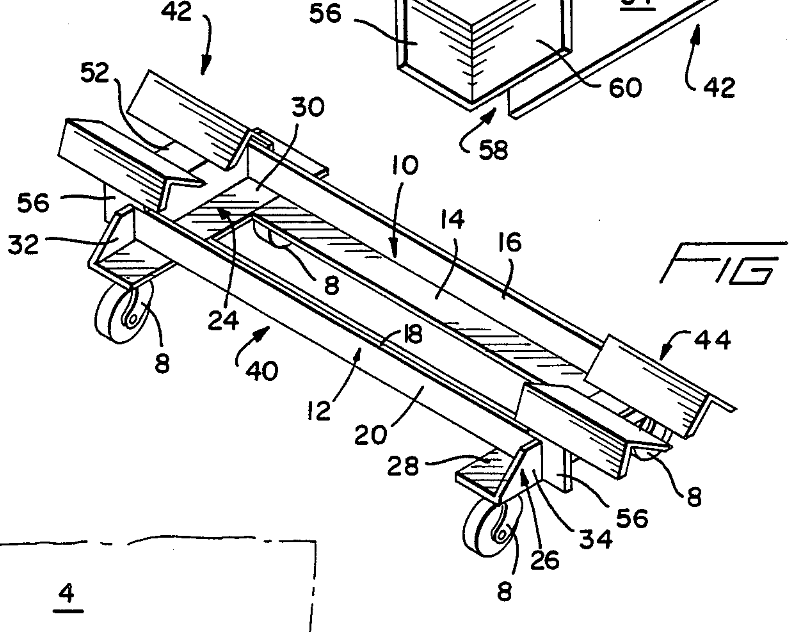
FIG 5
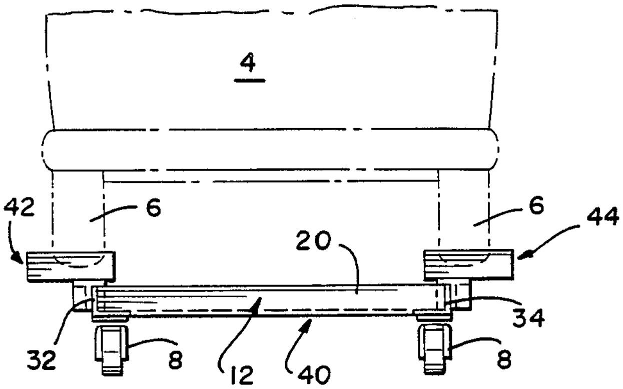
FIG 8

AUTOMOBILE DOLLY SYSTEM

TECHNICAL FIELD

This invention relates to an apparatus for use in moving an automobile about in a repair shop.

BACKGROUND ART

When repairing an automobile, or the like, it is frequently necessary to move it about in the repair shop. For example, it may be necessary to perform structural repairs in one location and body repair in one or more other locations of the shop. It is frequently desirable to perform these operations without necessarily having the automobile in a condition that it can be moved under its one power or on its own wheels. Thus, a problem is presented if a suspension system is undergoing repair and it is desired to move the automobile to another station to conduct other repairs before the suspension system repairs are completed.

It is known to use a dolly to assist in towing a vehicle, one such dolly being shown in U.S. Pat. No. 4,060,258 (Pigeon). In this device, two frame members are attached together to receive two wheels of a towed vehicle. Each of the wheel-receiving portions is a rectangular frame made of rectangular tubing, and the bottom is a curved plate for receiving a tire. This apparatus is designed exclusively for towing and does not employ casters and would thus not be suitable for moving an automobile about a shop.

U.S. Pat. No. 1,343,650 (Snyder) shows a dolly comprising a curved plate for receiving a tire which is supported by four casters. The curved plate is adjustably mounted to the casters to vary the height of the curved plate above the floor. This apparatus is taught to be useful for removal and installation of a heavy tire or for moving that tire about. Similar devices are shown in U.S. Pat. Nos. 2,246,882 (Gentry) and 863,122 (Weber).

U.S. Pat. No. 3,982,768 (Getman) shows a dolly for moving an automobile wherein two cradles are mounted to a flat surface. This is useful only for engaging an axle or other part of the suspension system.

SUMMARY OF THE INVENTION

In accordance with the invention, a dolly is provided which is useful for moving an automobile about a repair shop. The apparatus is particularly useful because it can receive either a tire of an automobile or a jackstand for supporting the automobile without the wheels installed.

In one embodiment, the dolly has a length approximately equal to the width of the automobile such that both the front or the rear tires may be engaged by the frame of the dolly. If work is not to be conducted on the suspension system, it is preferable that the front wheels be placed in one dolly and the rear wheels be placed in a second dolly so that the automobile may be moved about the shop very easily. If the suspension system is to be repaired, necessitating removal of a wheel, a jackstand may be placed on the frame of the dolly to support the automobile frame without a wheel.

The frame of the dolly comprises a generally flat bottom and upstanding edges. The edges and bottom cooperate to receive safely any of various known jackstands or a tire.

The dolly is supported by four casters to facilitate movement. In practice, an entire automobile may be easily moved by one person.

In a second embodiment, the dolly is shorter than the width of an automobile. In this embodiment, the frame of the dolly is not long enough to receive an automobile tire but is long enough to receive jackstands to support the automobile with the wheels removed. An accessory to the shorter dolly embodiment slips over end pieces of the dolly frame and extends outwardly from the dolly to provide a cradle for receiving a wheel to support the automobile.

It is an object of this invention to provide a unique dolly for allowing an automobile to be easily moved about a repair shop.

A further object of this invention is to provide a unique dolly which can support an automobile either by engaging the tires or by the use of jackstands.

BRIEF DESCRIPTION OF THE DRAWINGS

FIG. 5 is a perspective view of a second embodiment of a dolly in accordance with the invention.

FIG. 6 is a perspective view of an accessory for use with the embodiment shown in FIG. 5 from above.

FIG. 7 is a perspective of the accessory of FIG. 6 from below.

FIG. 8 is an end view of an automobile supported by the dolly of FIG. 5.

DETAILED DESCRIPTION OF THE INVENTION

Figure 1:
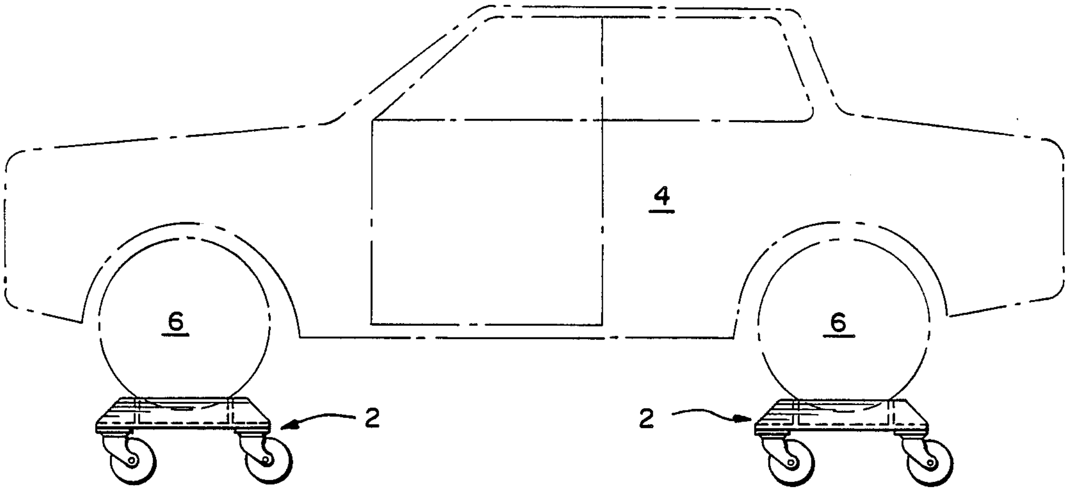
FIG. 1 is a side view of two dollies in accordance with the invention in use with an automobile shown in phantom lines.

FIG. 1 is a side view of two dollies 2 shown in use supporting an automobile 4, which is shown in phantom lines. In this illustration, the automobile has wheels 6 in place, and the wheels engage a respective dolly 2 for supporting the automobile. As will be appreciated below, the apparatus of the invention allows the automobile to be supported either by wheels or by jackstands.

Figure 2:
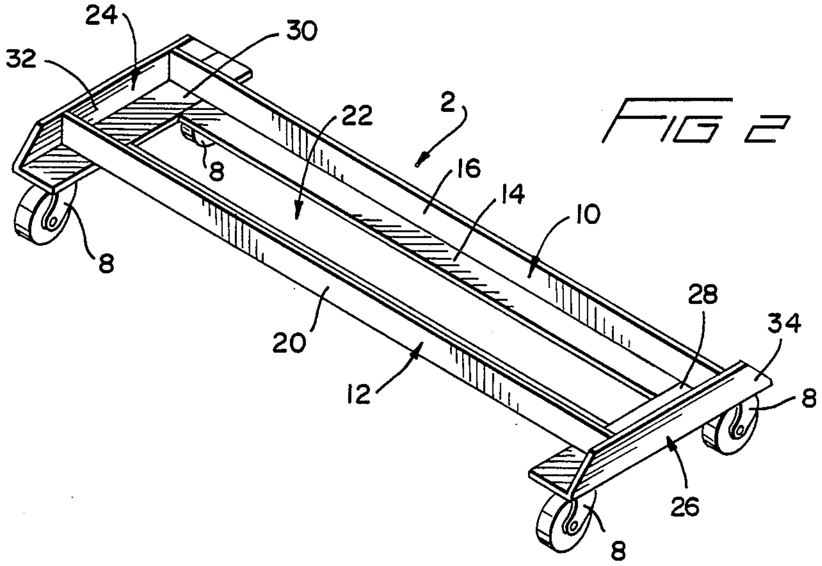
FIG. 2 is a perspective view of a first embodiment of a dolly in accordance with the invention.

FIG. 2 is a perspective view of a single dolly 2. The dolly comprises a frame supported by casters 8. The frame is preferably constructed of sections of L-shaped steel. A first section 10 is generally parallel to a second section 12. Section 10 includes a horizontal part 14 and a substantially vertical part 16, and section 12 includes a horizontal part 18 and a substantially vertical part 20. The two horizontal sections 14 and 18 provide a substantially flat bottom for the frame for a purpose which will be made clear below. Sections 10 and 12 are spaced to provide an open area 22 therebetween. The horizontal and vertical parts of the sections and the space 22 thus cooperate to provide a receptacle for wheels 6. Preferably, the wheel engages the edges of horizontal and vertical surfaces 14, 18, 16, and 20 and extends slightly into open area 22.

End sections 24 and 26 are secured to sections 10 and 12, and casters 8 are attached to the end sections. The end sections are also preferably made of L-shaped steel members and provide horizontal surfaces 28 and 30 and vertical surfaces 32 and 34.

Figure 3:
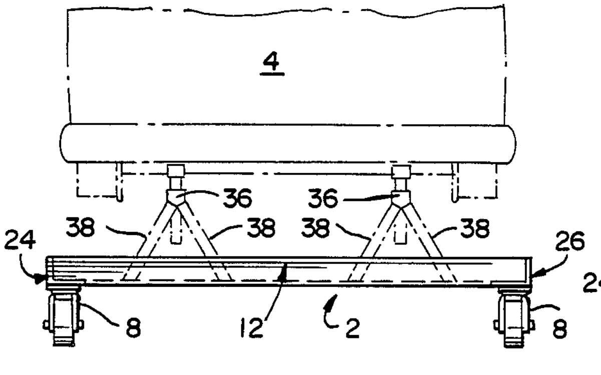
FIG. 3 is an end view of an automobile supported by the dolly of FIG. 2 and two jackstands.
Figure 4:
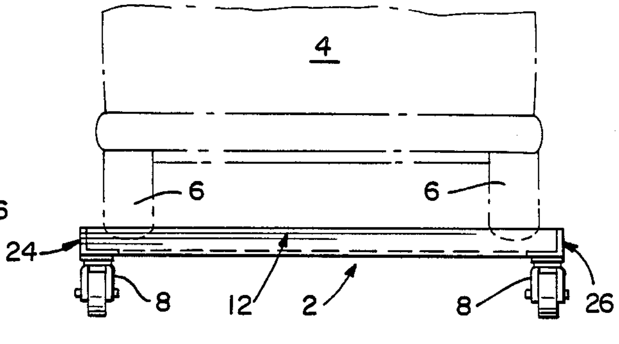
FIG. 4 is an end view of an automobile supported by the dolly of FIG. 2 with the wheels on the automobile.

FIGS. 3 and 4 show alternative uses for the dolly of FIG. 2 to illustrate its flexibility particularly designed for a repair shop. FIG. 3 is an end view of automobile 4 supported by a dolly 2 but wherein the wheels have been removed. This situation would occur, for example, when repairs on the automobile require removal of the wheels. Two jackstands 36, of known construction, are placed on dolly 2 and engage automobile 4 to support it. It will appreciated that jackstands 36 are typically adjustable in height and include a base designed to rest on the floor. The type shown in FIG. 3 include a pyramidal base made of four elements 38, only two of which are shown for each jackstand 36. Because the dolly 2 includes horizontal surfaces 14 and 18, as described above, an essentially flat surface is provided for secure placement of jackstands 36 thereon.

FIG. 4 is an end view of an automobile 4 supported by a dolly 2, but wherein wheels 6 are installed on the automobile. As described above, the dolly of FIG. 2 is uniquely designed to engage wheels 6 as shown in FIG. 4 as well as the jackstands 36 as shown in FIG. 3.

In a preferred embodiment, dolly 2 is approximately 177 cm. in length and 61 cm. in width. Vertical surfaces 16 and 20 are spaced by about 36 cm.

FIGS. 5 through 8 illustrate a second embodiment of the apparatus in accordance with the invention. With reference to FIG. 5, dolly 40 is similar to that shown in FIG. 2, but is somewhat shorter. The length of the preferred second embodiment is about 123 cm. The length of dolly 2 shown in FIG. 2 is preferably approximately equal to the width of automobile 4, whereas the length of dolly 40 as shown in FIG. 5 is somewhat shorter than the automobile's width. In other respects, dolly 40 is identical to that shown in FIG. 2, and similar reference numerals have been employed.

Attached to respective ends of dolly 40 are accessory cradles 42 and 44, which are preferably identical. These cradles are shown in more detail in FIGS. 6 and 7.

Cradle 42 includes roof-shaped elements 46 and 48 secured to bracket 50. Bracket 50 includes a horizontal part 52, a rear wall 54, and two side walls 56. Side walls 56 do not extend completely to rear wall 54 such that a slot 58 is formed therebetween. Inwardly directed walls 60 extend from the edges of sidewalls 56 adjacent slot 58 so that slot 58 is elongate. The accessory cradles are preferably about 35 cm. in width and 50 cm. in length.

As shown in FIG. 5, accessory cradle 42 is easily attached to dolly 40 by engaging a vertical wall 32 or 34 in slot 58. Side walls 56 and rear wall 54 are strong enough to support the weight of an automobile when wheels 6 are resting on accessory cradles 42 and 44 as shown in FIG. 8.

It will be appreciated that the dolly 40 of FIG. 5 is unique in that dolly 40 can receive jackstands as shown in FIG. 3 to support an automobile if the wheels have been removed to allow the automobile to be moved easily about a repair shop. If the automobile has wheels, it is only necessary to attach an accessory cradle 42 on one or both ends to engage a wheel.

While FIGS. 3, 4, and 8 illustrate situations where the two front wheels or rear wheels are either both in place or both removed, it will be appreciated that the apparatus of the invention fully allows one wheel to be removed and another wheel to remain in place. For example, if only wheel were in place, the arrangement shown in FIG. 3 would be modified to eliminate one of the jackstands 36 and to engage a wheel 6 on dolly 2. Similarly, if one of the wheels 6 shown in FIG. 8 were removed a jackstand 36 would be located as shown in FIG. 3 and the respective accessory cradle 42, or 44 would simply be detached.

It will be appreciated that a unique dolly has been described which has an unexpected facility for use in an automobile shop to permit an automobile under repair to be easily moved about. Modifications within the scope of the appended claims will be apparent to those of skill in the art.

I claim:

1. Apparatus for transporting an automobile undergoing repairs comprising frame means having a length less than or approximately equal to the width of said automobile for receiving a base of a jackstand, said jackstand has a base means for engaging and being supported by a generally planar surface and is separate from said frame means, and wherein said frame means is at least of a strength adequate to support said jackstand and the force on the suspension system of said automobile created by the weight of said automobile, said frame means comprising means for supporting said jackstand comprising a pair of parallel substantially flat surfaces with a width approximately equal to the width of said base means for receiving said base means and two upstanding edges extending in substantially parallel directions and extending upwardly from said pair of parallel substantially flat surfaces for securely receiving a tire of said automobile and for providing an abutment for opposite sides of said base means of said jackstand when said base means is engaged on said substantially flat portion, whereby said base means may be supported on said bottom surface between said two edges, first and second end means for connecting said pair of parallel substantially flat surfaces, caster support means extending laterally outwardly from said frame means, and castering wheel means attached to said caster support means for allowing said frame, jackstand, and automobile to be easily moved about.

2. Apparatus according to claim 1 wherein said frame means comprises substantially parallel sections of steel which are L-shaped in cross section.

3. Apparatus according to claim 2 wherein said frame means further comprises two end walls, each of said two end walls extending between said edges at respective ends of said two edges.

4. Apparatus according to claim 2 wherein the length of said frame means is substantially equal to the width of said automobile.

5. Apparatus according to claim 3 further comprising auxiliary means for receiving and supporting a wheel of said automobile, said auxiliary means comprising cradle means for receiving said wheel and means for engaging one of said end walls to support said auxiliary means on said frame means.

6. Apparatus for transporting an automobile undergoing repairs comprising frame means for receiving a base of a jackstand for supporting said jackstand and at least partially supporting said automobile, said frame means comprising a substantially flat bottom surface and two substantially parallel upstanding edges, said two edges being spaced by a distance greater than the width of said base whereby said base may be set on said bottom surface between said two edges, and castering wheel means at each end of said frame means for allowing said apparatus, jackstand, and automobile to be easily moved about, wherein said frame means comprises substantially parallel sections of steel which are L-shaped in cross section and further comprising two end walls, each of said two end walls extending between said edges at respective ends of said two edges, auxiliary means for receiving and supporting a wheel of said automobile, said auxiliary means comprising cradle means for receiving said wheel and means for engaging one of said end walls to support said auxiliary means on said frame means, wherein said means for engaging one of said end walls comprises two flat plates spaced to form a slot for receiving said end wall.

7. Apparatus according to claim 6 wherein said cradle means comprises two substantially parallel sections of steel which are L-shaped in cross section with the concave sides thereof facing in the direction of said two flat plates.

8. Apparatus for transporting an automobile undergoing repair comprising a dolly and at least one jackstand separate from said dolly, said jackstand comprising a base means for engaging and being supported by a generally planar surface and a support and means for connecting adjacent ends of said parrallel side elements said automobile, said dolly comprising a frame and wheel means, said frame having parallel side elements with upstanding wall portions and substantially horizontal floor portions, said floor portions extending inwardly of said wall portions, and said wall portions being spaced by a distance greater than a transverse dimension of said base means for providing an abutment for said base means when said jackstand is on said dolly and for securely receiving a tire on said automobile, said wheel means being supported by a bracket extending transversely at each end of said frame having wheel support portions extending outwardly from said side elements, and casters attached to respective ones of said wheel support portions.

* * * * *